US008332070B2

(12) United States Patent
Gläser et al.

(10) Patent No.: US 8,332,070 B2
(45) Date of Patent: Dec. 11, 2012

(54) LEARNING AND USE OF SCHEMATA IN ROBOTIC DEVICES

(75) Inventors: Claudius Gläser, Grosskrotzenburg (DE); Frank Joublin, Mainhausen (DE)

(73) Assignee: Honda Research Institute Europe GmbH, Offenbach/Main (DE)

( * ) Notice: Subject to any disclaimer, the term of this patent is extended or adjusted under 35 U.S.C. 154(b) by 539 days.

(21) Appl. No.: 12/619,840

(22) Filed: Nov. 17, 2009

(65) Prior Publication Data
US 2010/0249999 A1    Sep. 30, 2010

(30) Foreign Application Priority Data

Feb. 6, 2009    (EP) .................................... 09001710

(51) Int. Cl.
*G05B 19/04*    (2006.01)
*G05B 15/00*    (2006.01)
*G05B 13/02*    (2006.01)
*G06F 19/00*    (2011.01)
*G06E 1/00*    (2006.01)

(52) U.S. Cl. .......... 700/246; 700/245; 700/258; 901/46; 706/21; 706/23

(58) Field of Classification Search .................. 700/245, 700/246, 258; 901/46; 706/21, 23
See application file for complete search history.

(56) References Cited

U.S. PATENT DOCUMENTS

| | | | | |
|---|---|---|---|---|
| 6,175,772 B1 * | 1/2001 | Kamiya et al. | .................. | 700/31 |
| 6,295,602 B1 * | 9/2001 | Weissman et al. | ................ | 713/1 |
| 6,347,261 B1 * | 2/2002 | Sakaue et al. | ................. | 700/245 |
| 6,359,622 B1 * | 3/2002 | Hayes-Roth | .................. | 345/474 |
| 6,490,501 B1 * | 12/2002 | Saunders | ....................... | 700/198 |
| 6,529,887 B1 * | 3/2003 | Doya et al. | ...................... | 706/12 |
| 6,587,846 B1 * | 7/2003 | LaMuth | .......................... | 706/21 |
| 6,708,081 B2 * | 3/2004 | Yoshida | ........................ | 700/245 |
| 7,333,969 B2 * | 2/2008 | Lee et al. | ......................... | 706/52 |
| 2001/0047226 A1 * | 11/2001 | Saijo et al. | .................... | 700/261 |
| 2004/0054638 A1 * | 3/2004 | Agami et al. | ................... | 706/46 |
| 2006/0184273 A1 * | 8/2006 | Sawada et al. | ................ | 700/245 |

OTHER PUBLICATIONS

Jun Tani et al., Achieving "organic compositionality" through self-organization: Reviews on brain-inspired robotics experiments, Neural Networks, vol. 21, 2008, pp. 584-603.
Norihiko Itoh et al., "An Incremental Behavior Learning based on Reinforcement Learning with Schema Extraction Mechanism for Autonomous Mobile Robot", SICE Annual Conference, Aug. 4-6, 2003, pp. 1948-1953.

* cited by examiner

*Primary Examiner* — James Trammell
*Assistant Examiner* — Majdi Alsomiri
(74) *Attorney, Agent, or Firm* — Squire Sanders (US) LLP

(57) ABSTRACT

A robotic controller using schemata, the schemata being a set of parameterized sequences of motor commands in order to make a robot to achieve a set goal, the parameters of the sequences being gained from the state variables of the robotic controller, a robotic controller comprising an interface for supplying sensory input to the robotic controller. A schemata state memory (1) structure supplied with either input from a schemata recognition module (4) or input from an inverse model module (2) or combinations of them. An inverse model module (2) for generating motor commands based on state variables and stored schemata, a forward model module (3) for predicting state variables based on state variables and stored schemata, and a schemata recognition module (4) for selecting a schemata based on supplied state variables of the robot controlled by the robotic controller.

19 Claims, 7 Drawing Sheets

LEARNING AND USE OF SCHEMATA IN ROBOTIC DEVICES

FIELD OF INVENTION

The present invention relates to a system and methods for the learning and use of goal-specific forward and inverse models of a robotic device, esp. a behavior-based robotic device as well as a goal prediction model.

The inverse model generates commands for motor-driven actuators of the robotic device.

The forward model predicts state variables of the robotic device.

The invention also relates to a robotic device having a computing unit implementing such a method.

The models are embedded in a system which allows the learning of the models through observation of sensorimotor pattern sequences. Thereby, the term sensorimotor pattern refers to values of state variables and motor commands. Such observations may be produced via motor babbling, which is a random execution of motor commands (generated by a control unit), or direct guidance. The present invention further relates to the use of the system and methods for goal-directed behavior control and goal inference of robotic devices. Example applications are eye-hand coordination, object manipulation, or action understanding by a robotic device, respectively.

BACKGROUND

Existing approaches to the segmentation of sensorimotor pattern sequences into causal chunks include the Modular Selection and Identification for Control (MOSAIC) model (D. M. Wolpert and M. Kawato, 'Multiple paired forward and inverse models for motor control', *Neural Networks*, 11, pp. 1317-1329, 1998) and the recurrent neural network with parametric bias (RNNPB) model (J. Tani, 'Learning to generate articulated behavior through the bottom-up and the top-down interaction processes', *Neural Networks*, 16, pp. 11-23, 2003; J. Tani, M. Ito, and Y. Sugita, 'Self-organization of distributedly represented multiple behavior schemata in a mirror system: reviews of robot experiments using RNNPB', *Neural Networks*, 17, pp. 1273-1289, 2004; U.S. Pat. No. 7,373,333; U.S. Pat. No. 7,324,980; EP1505534).

The MOSAIC model is composed of multiple modules, each of them consisting of a pair of a forward and an inverse model. Thereby, the forward models concurrently try to describe the observed patterns whereas the inverse models cooperatively contribute to the overall control of the robotic device depending on their forward models' prediction quality. If it is assumed that each forward-inverse model pair represents a schema then the differences to the present invention are as follows:

(1) Even though MOSAIC allows multiple schemata to be simultaneously active, the active schemata do not cooperatively predict future values of the state variables. Rather a concurrent prediction is applied insofar as each of the forward models predicts the state variable values of the whole system. Therefore, MOSAIC does not allow the learning or use of a combinatorial code for the description of the system dynamics, whereas the present invention does.

(2) MOSAIC proposes to use multiple forward and inverse models, more precisely, one forward-inverse model pair for each schema. In contrast, the present invention proposes to use a single processing structure (e.g. an artificial neural network) for the forward model and the inverse model, respectively. Thereby, the computational as well as the memory complexity is reduced.

(3) MOSAIC does not incorporate an explicit memory structure for the states of schemata. The present invention uses such a structure. Furthermore, the present invention uses the memorized schemata states in order to set the mode of the processing structures carrying out forward and inverse modeling. As a result the present invention allows the learning and use of a topographic organization of schemata which is not possible within the MOSAIC model.

(4) MOSAIC does not incorporate a separate processing module carrying out the recognition of schemata. Rather, MOSAIC uses the forward models insofar as the forward models' qualities in describing observed pattern sequences determines which schemata have been recognized. Therefore, the MOSAIC model does not allow a dynamic recognition of schemata insofar as whole pattern sequences have to be compared with the sequences predicted by the forward models. In contrast, the present invention allows a dynamic recognition of schemata.

(5) Lastly, MOSAIC does not incorporate the concept of a schema as a compact representation of an attractor dynamic. This means that a forward-inverse model pair of MOSAIC represents multiple dynamics; however, these dynamics do not necessarily have a common fixed point. Therefore, MOSAIC does not allow the usage of the forward-inverse model pairs for goal-directed behavior control and goal inference as the present invention does.

The RNNPB model uses a single recurrent neural network (RNN) in which sensorimotor pattern sequences are distributely represented. It further uses parametric bias (PB) vectors as input to the RNN in order to drive the network in a certain mode. The differences between the RNNPB model and the present invention are as follows:

(1) In RNNPB a memory structure is thought to save PB vectors corresponding to certain behaviors. Upon execution of a behavior the corresponding PB vector is fed to the RNN which in turn performs the forward modeling. In contrast, the present invention proposes to use the schemata states in order to drive the network in its corresponding mode. For this reason, the present invention allows the system dynamics to be cooperatively predicted by multiple schemata.

(2) In RNNPB behaviors are recognized using the forward model. More precisely, an inverse iterative search procedure is applied in order to determine the PB vector which best describes the observed pattern sequence. In contrast, the present invention proposes to use a separate processing structure for the recognition of an attractor dynamic describing the observed behavior. As a consequence RNNPB does not allow a dynamic recognition of behavior, whereas the present invention does.

(3) RNNPB does not allow multiple behaviors to be simultaneously active since this would imply that multiple PB vectors are fed into the RNN. In contrast, the present invention allows multiple schemata to be simultaneously active. Thereby, the present invention allows the learning and use of a combinatorial schemata code which is a property RNNPB does not offer.

(4) In the RNNPB model the parameters (weight values and PB vectors) are trained in an offline fashion, whereas the present invention allows an online learning.

(5) Lastly, RNNPB does not incorporate the concept of a schema as a compact representation of an attractor dynamic.

OBJECT OF THE INVENTION

It is the object of the invention to improve the behavior of a robot when interacting with its environment.

This object is achieved by means of the features of the independent claims. The dependent claims develop further the central idea of the present invention.

According to the invention a robotic controller is proposed using schemata in order to achieve a set goal. The schemata are a set of parameterized sequences of motor commands in order to make a robot achieve a set goal. The parameters for the sequences are gained from state variables of the robot controlled by the robotic controller. Thereby, the state variables represent a sensed (internal) state. The value of a state variable is computed from both, the sensory input of a robot and other state variables. The robotic controller comprises:

- an interface for supplying sensory input to the robotic controller,
- a schemata state memory (1) structure supplied with either the output of a schemata recognition module (4), or hierarchical feedback from an inverse model module (2), or combinations of them,
- an inverse model module (2) for generating motor commands based on sensory input and stored schemata,
- a forward model module (3) for predicting state variables based on state variables and stored schemata, and
- a schemata recognition module (4) for selecting a schemata based on supplied state variables of the robot controlled by the robotic controller.

Optionally, the controller may further comprise a sensory mapping module for updating state variables of the robot controlled y the robotic controller based on the sensory input and state variables. Further, the controller may comprise a goal setting module for selecting high-level behaviors (schemata) of the robotic device based on state variables, wherein the schemata state memory (1) structure is additionally supplied with the output of the goal setting module.

The architecture of the inventive controller provides a deep coupling between robot perception and action that allows the robot to reason about sensory input in terms of his own capabilities and is a key to enabling imitative behavior of the robot, e.g. when the robot observes actions taken by a human or another robot and maps them on his own repertoire of behaviours.

Further features, objects and advantages will become evident for the skilled person when reading the following detailed description of embodiments of the invention, when taken in conjunction with the figures of the enclosed drawings.

INTRODUCTION

Figure 1:
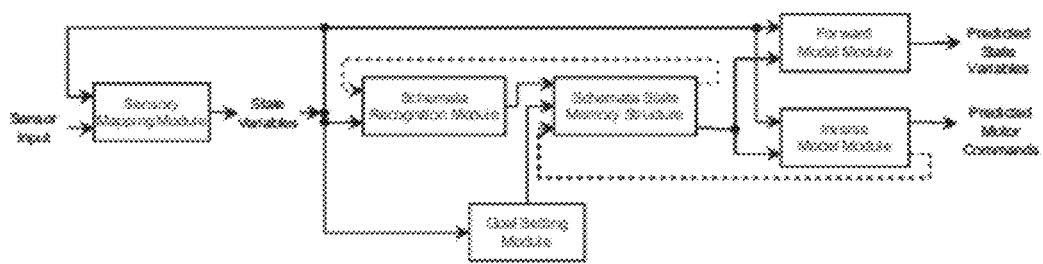
FIG. 1 shows the schemata-based system. Thereby, dashed lines indicate connections which are optionally present when using hierarchically organized schemata.

Rules ("schemata") for the interaction of a robotic device with the physical world are cognitive structures describing regularities within experiences. They, thus, serve for the organization of the robotic device knowledge and define how the robotic device sees and interprets its environment. Schemata are hierarchically organized, thereby they represent knowledge at all levels of abstraction. Schemata at the lowest level of a hierarchy have to describe the spatio-temporal sensorimotor patterns which the robotic device observes when it interacts with its environment. Thereby, the term sensorimotor pattern refers to values of state variables and motor commands. Schemata, thus, segment the continuous stream of events into causal chunks.

The invention proposes a system (i.e. a robotic controller) and methods for the learning and use of such schemata. Therefore, at first a definition of schemata will be given and it will be discussed how hierarchically organized schemata, if embedded into the proposed system, can be used for goal-directed behavior control, planning, and goal inference of a robotic device. Moreover, the invention proposes a specific implementation of the framework. The implementation does not support a hierarchical organization of schemata. It rather focuses on the learning of low-level schemata as well as the incorporation of plausible processing principles in a coherent framework. However, the implementation can be easily extended to support hierarchically organized schemata. Finally, simulation results will be presented which show that the proposed framework is able to autonomously develop sensorimotor schemata which correspond to generic behaviors. Thereby, the learned mapping between schemata and sensorimotor pattern sequences is topology preserving, i.e. neighboring schemata represent similar behaviors. Moreover, the schemata feature properties which are in accordance with biological findings.

Schemata-Based System

The schemata according to the present invention describe generic behaviors of a robotic device. For this reason, both terms will be used interchangeably. Since a generic behavior only carries meaningful information if its application results in a specific situation, a schema is characterized by the goal which the application of such a generic behavior entails. Thereby, the term generic refers to the fact that the behavior can be applied in a variety of situations, but always yields a situation corresponding to its goal. For example a GazeAtHand schema should result in a situation where the robotic device sees its hand in the fovea, i.e. the center of the camera input field. However, the spatio-temporal sensorimotor patterns the robotic device observes when applying the schema might be very different (e.g. depending on the initial gaze, i.e. the camera input field position, and the robot's hand position). A schema is, thus, a compact representation of a global attractor dynamic which for various contexts describes how to reach a single equilibrium point. Thereby, the dynamic's equilibrium point represents the schema's goal.

Technically expressed, a schemata is a parameterized sequence of actions (motor commands) of a robot in order to achieve a set target, the actions (motor commands) being computed by a robotic controller depending on its state variables as parameter.

The sequence of motor commands is called "behavior".

Based on this definition of schemata a robotic device having the system shown in FIG. 1 is proposed. Besides a unit 1 for the memorization of the current states of the schemata (e.g. active or inactive), the system is composed of three integral parts. Firstly, given a situation defined by the state variables and a schema, an Inverse Model module 2 computes and issues motor commands which are suitable for reaching the schema's goal, i.e. when the motor commands are send from a control unit (implementing the system of FIG. 1) to motor-driven actuators of the robotic device.

Secondly, given a situation defined by the state variables, the control unit of the robotic device (also called "robotic controller") predicts the sensory consequences of applying a schema in this situation, wherein the sensory consequences are expressed in terms of state variables, i.e. sensed (internal) states of the robotic device. This function is implemented by the Forward Model Module 3.

Lastly, the robotic controller is able to determine which schemata best describe an observed stream of perceptual events. The Schemata Recognizer module 4 thus maps observations (expressed by sensed state variables) onto own experiences which is a fundamental ability for interaction.

Figure 2:
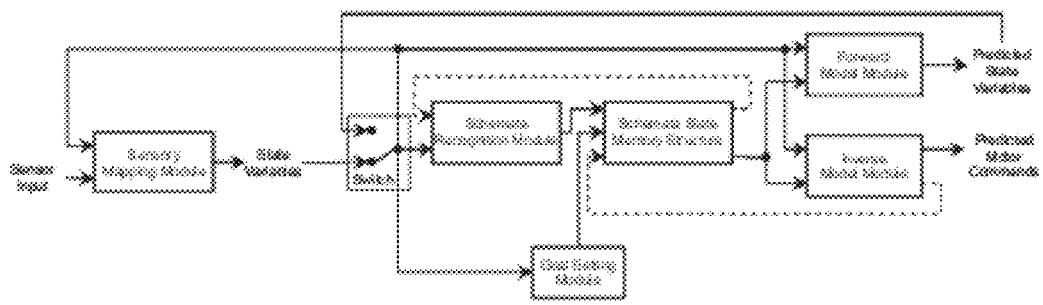
FIG. 2 shows the schemata-based system. Compared to the system shown in FIG. 1 a Switching Module has been added. This Switching Module allows a robotic device to either rely on observed or predicted state variable values.

The system shown in FIG. 1 can be extended by an additional Switching Module 5 (see FIG. 2). The Switching module 5 allows the schemata recognition module 4 of the robotic controller to either use current observations (i.e. currently sensed state variables of the robot) in switch position A or predicted observations (i.e. predicted state variables) in switch position B. By using previously predicted state variables as input the forward modeling performs a look-ahead prediction of arbitrary time. It thus allows the control unit of the robotic device to internally simulate the application of schemata (without actually executing them, i.e. without issuing the motor commands to the actuators of the robotic device), which is a property being crucial for planning.

A hierarchical organization of schemata is beneficial since it allows us to structure knowledge, reuse schemata, and combine them to more complex behaviors. When using schemata hierarchies the high-level behavior of the robotic device can be decomposed into its subgoals. This means that the Inverse Model not only has to specify the motor commands to be issued by the control unit of the robotic device, but it also has to select other lower-level schemata serving the high-level schema's subgoals. For example, the GazeAtHand schema introduced above could select another GazeToPositionXY schema, where the current situation (the hand position) specifies which GazeToPositionXY schema has to be selected. The GazeToPositionXY schema could in turn select the necessary motor commands to be issued. In other words, schema selection instantiates a schema, whereas the situation (defined by the state variables of the robotic controller) in which a schema is applied parametrizes the schema. As a consequence the system has to allow multiple schemata to be simultaneously active and, moreover, the simultaneously active schemata cooperatively predict the consequences of their application (by forward modeling).

Figure 3:
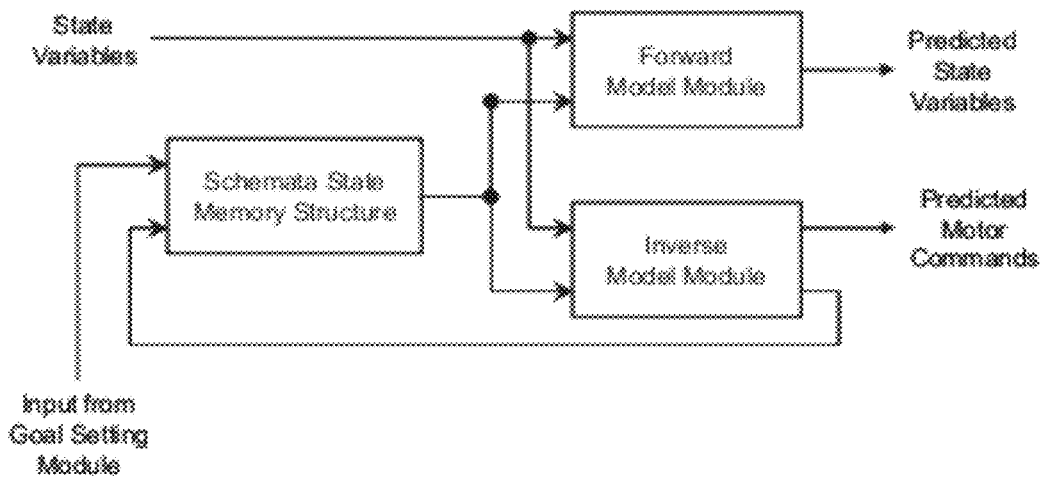
FIG. 3 shows the parts of the system which can be used for goal-directed behaviour control via goal decomposition.

FIG. 3 illustrates the part of the system comprised in the computing unit of the robotic device which is responsible for goal-directed behavior control via goal-decomposition. Thereby, an input from the goal setting module may set the high-level behavior and therefore also the high-level goal of the robotic device. The state variables parametrize the high-level behavior insofar as both the schema as well as the state variables are input to the Inverse Model. The Inverse Model can thus select other schemata which serve the high-level schema's subgoals. In the same way, the newly selected lower-level schemata could be decomposed by the Inverse Model. In other words, the Inverse Model module implements a situation-dependent goal decomposition, i.e. it decomposes a high-level behavior into its elementary parts. Finally, the schemata which represent the elementary parts select the motor commands (via the Inverse Model) which are suitable for reaching their corresponding goals (when supplied to motor-driven actuators of the robotic device).

Additionally, the Forward Model module is used for the prediction of the sensory consequences (in terms of predicting state variables). Given the values of the state variables as well as the active schemata the Forward Model module predicts the consequences which the application of the schemata entails.

Figure 4:
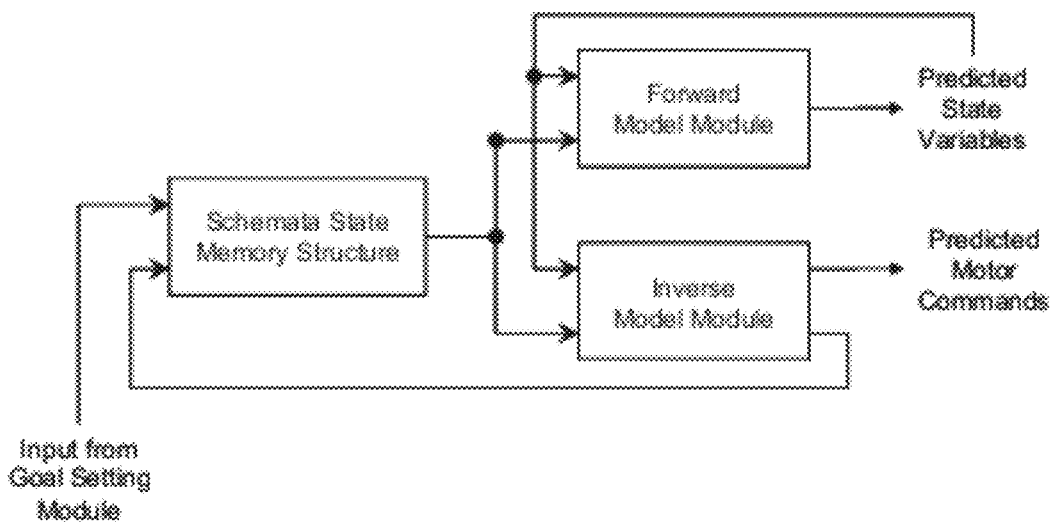
FIG. 4 shows the circuit of the system which can be used to mentally simulate goal-directed behaviour control via goal decomposition.

As shown in FIG. 3 the control unit of the robotic device relies on the current values of the state variables. These values represent the current situation which is used for the decomposition of goals as well as the prediction of the consequences. Similarly, the control unit of the robotic device may rely on predicted values of state variables (see FIG. 4). Given a starting situation, the control unit of the robotic device may decompose a high-level goal as previously described. However, the control unit may simultaneously predict the consequences of the selected schemata. Thereby, the predicted consequences correspond to an imagined situation. By using the imagined situation as input to the Forward Model module and the Inverse Model module the control unit is able to internally simulate goal-directed behavior control via goal decomposition. It can thus perform a look-ahead prediction of arbitrary time. During such a mental simulation the actions may not be executed in reality (e.g. another module may inhibit the selected motor commands by which the execution of them is impeded).

Figure 5:
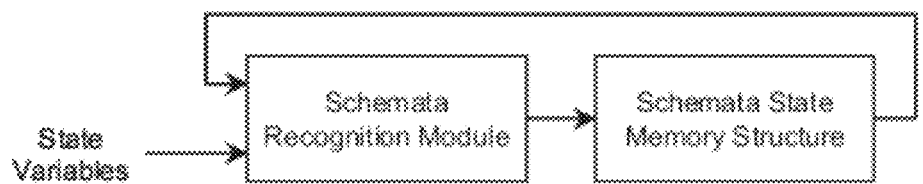
FIG. 5 shows the circuit by which schemata can be recognized. Furthermore, the circuit allows the inference of high-level goals insofar as the Schemata Recognition Module relies on already recognized lower-level schemata.

An additional advantage of using hierarchically organized schemata is that a schemata hierarchy can be used to infer high-level goals of interaction partners. If the control unit of the robotic device observes a sequence of state variable values, the Schemata Recognition Module maps the sequence onto schemata which best describe the observation. In a schemata hierarchy an observation of such a sequence could for example result in the recognition of a certain low-level schema. However, if the Schemata Recognition Module not only relies on the observed stream of state variable values, but also on already recognized schemata at a lower level of the hierarchy (see FIG. 5), even high-level schemata can be recognized. In other words, the Schemata Recognizer could use its recognition of elementary behavior parts to infer the high-level behavior. Coming back to our above mentioned example, the recognition of a GazeToPositionXY schema could automatically result in the recognition of the GazeAtHand schema if the hand is currently located at that position.

In the following we will give an example application which illustrates the use of hierarchically organized schemata for goal-directed behavior control of a robotic device via goal decomposition. The described procedures are implemented by a control unit of the robotic device.

Example

Assuming the task of the robotic device is to reach to an object. The robotic device is provided with a motor-driven arm with certain joints and a head with two movable cameras. The cameras represent sensors for external sensory input and are also motor-driven.

The robotic device senses the joint angles of its arm as well as the joints of the two cameras. Furthermore, the robot is able to apply, via motor commands, forces on the joints which allow the robot to change its gaze direction, to fixate an object, and to move its arm.

Then the state variables as computed by the sensory mapping module could be as follows:
  The joint angles of the robot's arm
  The joint angles of the robot's head supporting the cameras
  The position of an object in camera (eye-centered) coordinates
  The distance of an object from the cameras (which can be obtained from the joint angles of the eyes when fixating an object)
  The distance between an object and the hand in camera (eye-centered) coordinates.

Figure 6:
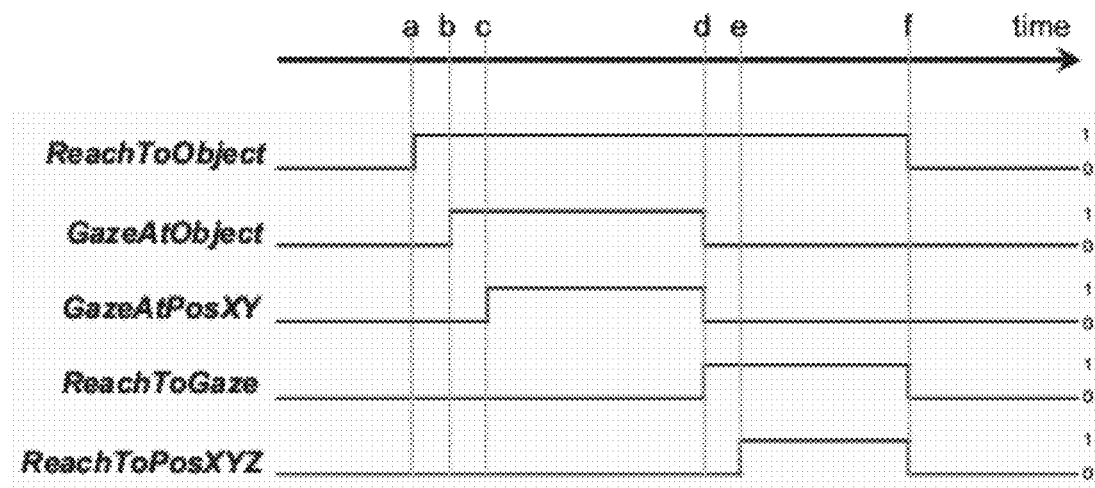
FIG. 6 exemplarily depicts the temporal evolution of schemata states when a robot reaches toward an object. For the detailed description of the key events (a-f) be referred to the text.

Furthermore, in the control unit of the robot the following schemata are stored (e.g. preset or acquired by preceding learning steps):
  ReachToObject, whose goal is to reach to an object using the robot's arm,
  GazeAtObject, whose goal is to gaze at an object and fixate it with the cameras
  Many GazeAtPosXY schemata, each of them having the goal to gaze at a certain position
  ReachToGaze, whose goal is to reach toward the position the robot gazes at
  Many ReachToPosXYZ schemata, each of them having the goal to reach to a certain 3D position in space In the following it will be described how the robot uses its schemata and the proposed system to reach to an object. Therefore, FIG. 6 shows the temporal evolution of schemata states (e.g. 0=inactive & 1=active) and further indicates key events (a-f) which will be described in more detail.
  a. An input from the goal setting module sets the ReachToObject state to 'active', i.e. the robots high-level goal is to reach toward an object detected via the sensory input, especially the camera.
  b. The ReachToObject schema decomposes its goal insofar as it activates the GazeAtObject schema via the Inverse Model.
  c. Given the object's actual position in camera coordinates as well as the actual camera joint angles (coding the current gaze position) the GazeAtObject schema decomposes its goal insofar as it activates a specific GazeAtPosXY schema whose goal is to change the gaze position to a certain position (the position where the object is currently located). This goal decomposition is done via the Inverse Model. In the following the GazeAtPosXY schema applies forces on the eye joints which depend on the actual eye joint angles. These motor commands are also selected via the Inverse Model.
  d. The camera joint angles have reached their final position. Consequently, the object position in camera coordinates also reached their final position. For this reason, the GazeAtObject schema now deselects the GazeAtPosXY schema via the Inverse Model. Similarly, the ReachToObject schema deselects the GazeAtObject schema and activates the ReachToGaze schema via the Inverse Model.
  e. The actual angles of the camera joints as well as the distance of the fixated object from the camera represent a 3D position in space. Given this 3D position the ReachToGaze schema selects a specific ReachToPosXYZ schema (whose goal is to bring the hand to this 3D position) via the Inverse Model. In the following the ReachToPosXYZ schema causes the control unit of the robotic device to issue motor commands such that forces are applied on the arm joints, where the forces are selected via the Inverse Model depending on the actual arm joint angles.
  f. Finally, the hand at the end of an arm of the robotic device reached the 3D position in space. For this reason, the ReachToGaze schema deselects the ReachToPosXYZ schema via the Inverse Model. Similarly, the distance between hand and object in camera coordinates vanished which let the ReachToObject schema deselect the ReachToGaze schema via the Inverse Model. Finally, the ReachToObject schema's goal has been achieved as well. For this reason, the input from the goal setting module which selected the ReachToObject schema may be absent from now on by which the ReachToObject schema becomes inactive.

The example described above illustrated the use of a schemata hierarchy in conjunction with the Inverse Model for goal-directed behavior control via goal decomposition. However, during the execution of the different schemata, the schemata can predict the sensory consequences (in terms of state variables) via the Forward Model as well. Thereby, a cooperative prediction is carried out insofar as specific schemata predict the consequences concerning specific state variables:
  The ReachToObject is able to predict that the distance between hand and object in camera coordinates decreases.
  The GazeAtObject schema is able to predict the object position in camera coordinates.

The GazeAtPosXY schema is able to predict the eye joint angles.

The ReachToGaze is able to predict the position of the hand in camera coordinates.

Finally, the ReachToPosXYZ is able to predict the arm joint angles.

In a very similar manner the observed trajectories of the state variables can be used to recognize the corresponding schemata via the Schemata Recognition Module. Thereby, already recognized schemata (at a lower level of the hierarchy) can be taken into account such that high level schemata become recognized. For example the observation of a decreasing distance between a hand and an object in camera coordinates can be used to recognize the ReachToObject schema. This could also be the case, if the observed hand is not the one of the robot, but that of an interaction partner. Therefore, this example also illustrates how schemata can be used to attribute goals to interaction partners.

Implementation

Figure 7:
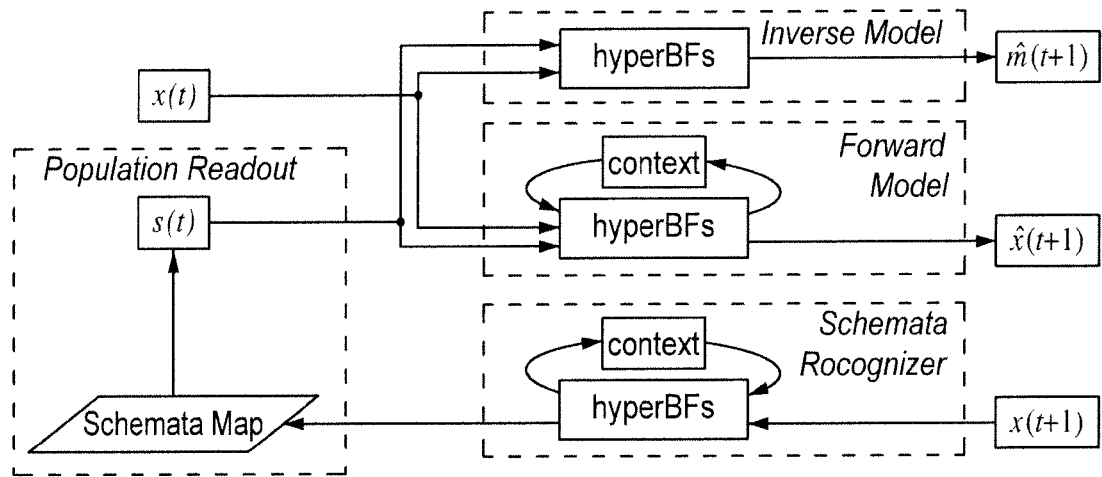
FIG. 7 illustrates the proposed implementation of the framework.

As previously noted, the present invention also proposes a specific implementation of the framework. The proposed implementation of the schemata system does not include hierarchical dependencies between schemata. Therefore, the system presented in this section does not include all the functionalities which were discussed in the previous section. However, the proposed implementation can be easily extended to do so. Rather the focus of this work laid on the online learning of low-level schemata and on the embedding of different processing principles within a coherent framework. FIG. 7 shows the system of the proposed implementation. In the following the different components will be described in more detail.

Implementation of the System Components

One of the principles applied is that of population coding. More precisely, units distributed in a 2-dimensional map represent schemata. Furthermore, the activity within this map encodes the multitude of simultaneously active schemata. What the framework then should achieve is to learn a topology preserving mapping from sensorimotor pattern sequences to schemata. In other words, schemata should be topographically organized such that neighboring units represent similar behaviors and therewith also serve similar goals.

Secondly, the Forward Model module is implemented by a single recurrent neural network (RNN). This means that sensorimotor patterns are distributely represented within a single network. Thereby the active schemata drive the RNN in its corresponding mode, i.e. the active schemata determine the sensorimotor pattern sequence the RNN produces. To summarize, the sensory forward prediction is modeled via an RNN using one hidden layer and context units, where the context unit activity at the output is fed back to the context unit activity at the input. The state variables $x(t)$ and the schemata map activity $s(t)$ serve as input to the RNN which in turn predicts the state variables $x(t+1)$ at the next time step.

Next, the Inverse Model is implemented as a feed-forward neural network with one hidden layer. Similar to the Forward Model, the state variables $x(t)$, which represents the current situation, as well as the schemata map activity $s(t)$, which represents the currently applied behaviors, serve as input to the network. The Inverse Model finally produces motor commands $m(t)$ suitable for reaching the schemata's goals.

Lastly, the Schemata Recognizer is implemented as an additional RNN. One more time, the RNN consists of one hidden layer and context units, where the output context activity is used as input at the next timestep. The Schemata Recognizer maps an observation $x(t+1)$ onto own experiences insofar as it activates the schemata $s(t)$ which best describe the observation.

The system further incorporates basis functions as flexible intermediate representations in the hidden layers. More precisely, the hyper basis function (HyperBF) framework (T. Poggio and F. Girosi, 'Networks for approximation and Learning', *Proceedings of the IEEE*, 78(9), pp. 1481-1497, 1990) is adopted in order to implement the Forward Model, the Inverse Model, as well as the Schemata Recognition Module.

Hyper Basis Function Networks

According to equation (1) a HyperBF network approximates a multivariate function $f(z)$ by a weighted combination of basis function activities as well as a bias b. Thereby, the weighted norm in equation (2), which incorporates the basis functions' centers $\xi_i$ and weighting matrices $W_i$, serves as an activation function, whereas the radial function G calculates the basis function activities. Here, G has been chosen according to equation (3).

$$f(z) \approx \hat{f}(z) = b + \sum_{i=1}^{N} \alpha_i \cdot G(\|z - \xi_i\|_{W_i}^2) \quad (1)$$

$$\|z - \xi_i\|_{W_i}^2 = (z - \xi_i)^T W_i^T W_i (z - \xi_i) \quad (2)$$

$$G(\lambda) = \exp^{-\lambda} \quad (3)$$

Figure 8:
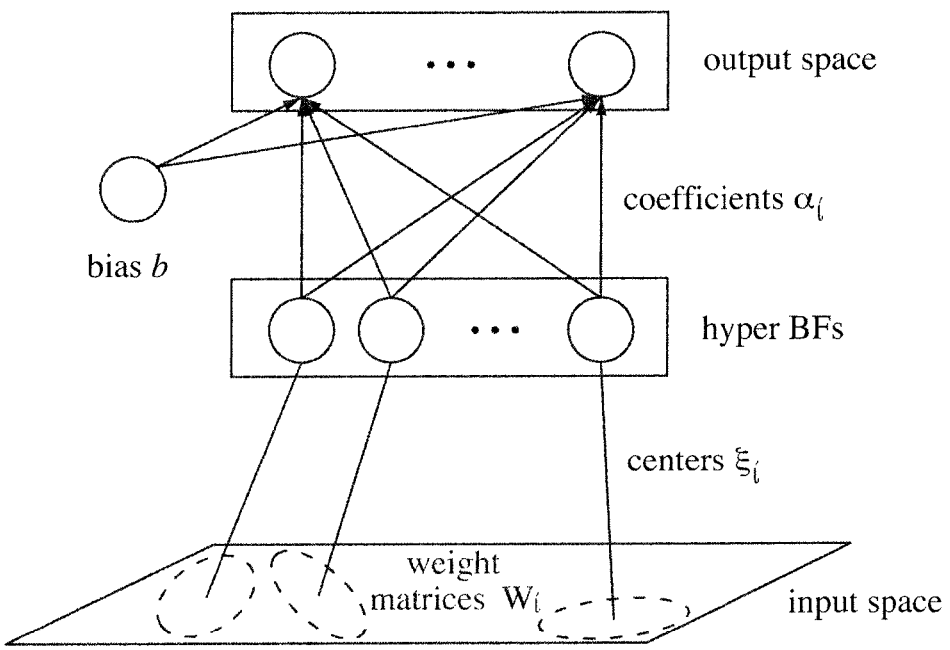
FIG. 8 shows a hyper basis function network.

FIG. 8 illustrates the HyperBF framework. Each of the basis functions in the hidden layer has a receptive field, whose center $\xi_i$ is a prototypical input vector. Furthermore, the weighting matrices $W_i$ describe the shape of the receptive field. Given an input z the basis function's activity will reach its maximum if z best matches the basis function's receptive field, i.e. $z = \xi_i$. Finally, the hidden layer activities are linearly combined with synaptic weights $\alpha_i$ in order to yield the output.

It is known that given a sufficiently high number of hidden units a HyperBF network can approximate any multivariate continuous function arbitrary well. Since the receptive fields of the basis functions are subject to change via some learning algorithm, HyperBF networks perform a task-dependent clustering as well as dimensionality reduction. These properties let HyperBF networks become well suited for sensorimotor transformation.

Theoretically the number of basis functions has to grow exponentially in the number of input dimensions, a problem usually called the curse of dimensionality. Since HyperBF networks perform a dimensionality reduction they are not as prone to this problem as other networks are. Nevertheless, we tried to minimize the number of input dimensions in order to make our implementation computationally feasible. Therefore, we do not feed the whole schemata map activity to the HyperBF networks; rather a population readout on the schemata map is performed and the locations of the resulting peaks are used as input.

Population Readout Mechanism

Let $p_i = (p_i^x, p_i^y)^T$ be the position of the schemata map's unit at grid index i. Furthermore, let $I_i(t)$ be the input to that unit at time t. According to equation (4) we first apply a sigmoidal function on the input in order to ensure positive activities of the units.

$$NI_i(t) = \frac{1}{1 + \exp(-I_i(t))} \quad (4)$$

Next, a population readout is performed where the map units interact via two types of lateral connections. Firstly, a pooling is accomplished via excitatory lateral weights $w_{i,j}^{exc}$ and, secondly, inhibitory weights $w_{i,j}^{inh}$ implement divisive normalization. We set both excitatory and inhibitory weights according to equation (5) where $\star \in \{exc, inh\}$ and $\sigma^{inh} = 2 \cdot \sigma^{exp}$.

$$w_{i,j}^* = \exp\left[-\left(\frac{\|p_j - p_i\|_2}{\sigma^*}\right)^2\right] \quad (5)$$

Iterating equations (6) and (7) for K times let the map activity $a_i(t)$ relax to smooth peaks.

$$u_i^{k+1}(t) = \sum_j w_{i,j}^{exc} \cdot a_j^k(t) \quad (6)$$

$$a_i^{k+1}(t) = \frac{u_i^{k+1}(t)^2}{\eta^{k+1}(t) + \mu \cdot \sum_j w_{i,j}^{inh} \cdot u_j^{k+1}(t)^2} \quad (7)$$

We set the initial activity $a_i^0(t) = NI_i(t)$, the divisive normalization weight $\mu = 1$, and $\eta^\kappa(t) = 4 \cdot \sum_j^N u_j^\kappa(t)/N$.

Let P(t) be the set of map indices whose units exhibit peak responses at time t. Then, the set of peak locations S(t) were obtained by calculating the center of masses within the local neighborhoods n of the units in P(t).

$$S(t) = \left\{ s(t) = \frac{\sum_j n_{i,j} \cdot p_j \cdot a_j^K(t)}{\sum_j n_{i,j} \cdot a_j^K(t)} \;\middle|\; \forall i \in \mathcal{P}(t) \right\} \quad (8)$$

$$n_{i,j} = \begin{cases} 1, & \text{if } \|p_j - p_i\|_2 \leq r \\ 0, & \text{otherwise} \end{cases} \quad (9)$$

Here, the radius r determining the size of the neighborhoods is set to $r = 3 \cdot \sigma^{exp}$.

Figure 9:
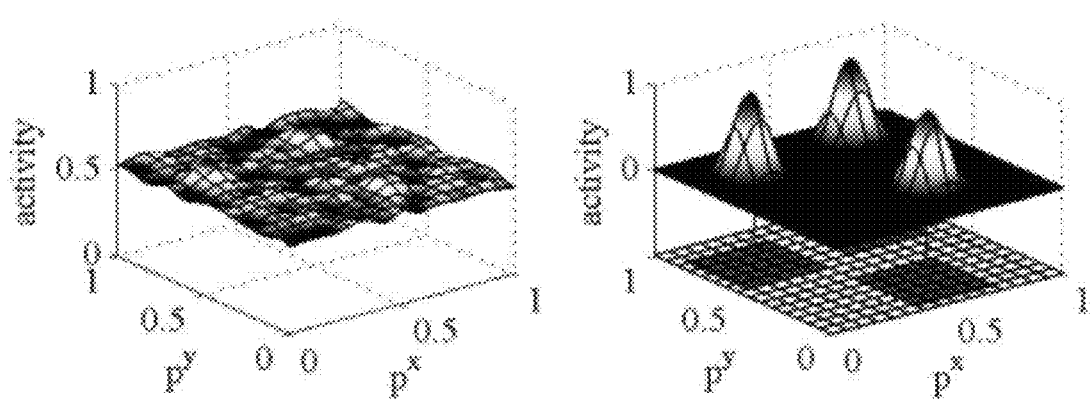
FIG. 9 illustrates the result of the population readout mechanism. The mechanism let the initial schemata map activity (left panel) evolve to smooth peaks (right panel). In the right panel the local neighbourhoods of the units exhibiting peak responses are additionally shown.

FIG. 9 illustrates the result of the population readout mechanism.

Handling Multiple Simultaneously Active Schemata

Let z(t) be the input to a HyperBF network (either the Forward Model or the Inverse Model). The input is composed of the peak location s(t) of the schemata map as well as other inputs i(t). Assuming the population readout mechanism results in M peaks at time t the set of peak locations is $S(t) = \{s_1(t), s_2(t), \ldots, s_M(t)\}$. Then we define the set of inputs Z(t) at time t according to equation (10). Furthermore, we define the activity $G_j(t)$ of hyper basis function j at time t according to equation (11).

$$\mathcal{Z}(t) = \left\{ z_i(t) = (s_i(t)^T, i(t)^T)^T \;\middle|\; \forall s_i(t) \in \mathcal{S}(t) \right\} \quad (10)$$

$$G_j(t) = \max_{z \in \mathcal{Z}(t)} G\left(\|z - \xi_j\|_{W_j}^2\right) \quad (11)$$

Learning Schemata

For learning the parameters of the Forward Model, of the Inverse Model, as well as of the Schemata Recognizer we assume that the robotic device observes a stream of sensorimotor patterns. Such a stream might be produced during an initial motor babbling phase or through direct guidance.

The following strategy was applied for learning the network parameters. Given the sequence of state variable values, the Schemata Recognizer activates the schemata which best describe the sequence. The recognized schemata are in turn used by the Forward Model and by the Inverse Model in order to predict the sensorimotor patterns. Finally, we calculated the prediction error of the Forward Model as well as the Inverse Model and applied the Backpropagation Through Time (BPTT) algorithm in order to adjust the network parameters of all system components. In order to make the learning algorithm capable for online operation the truncated version of the BPTT algorithm can be used.

Figure 10:
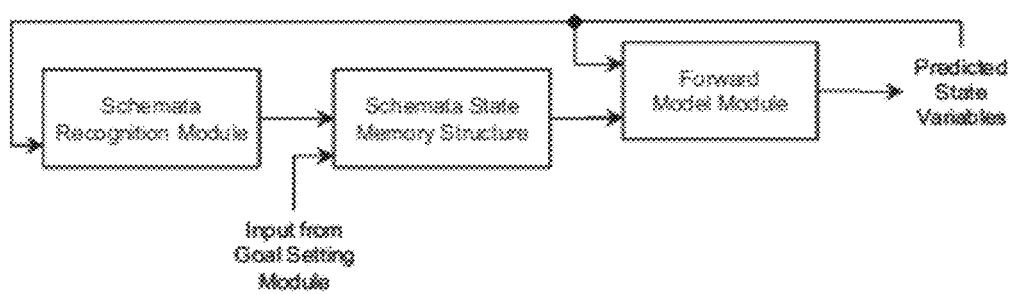
FIG. 10 illustrates a strategy for the learning of the parameters of the Schemata Recognizer.

For learning the parameters of the Schemata Recognizer another strategy can be alternatively applied. This strategy is illustrated in FIG. 10 and works as follows. An input from the goal setting module may select schemata and activate them. Next, the active schemata are used by the Forward Model in order to predict the consequences of their application. The Forward Model, thus, produces a sequence of state variable values. This sequence can in turn be fed into the Schemata Recognition Module which should activate the schemata which were already selected by the input from the goal setting module. Consequently, a recognition error can be calculated in the Schemata State Memory Structure which is based on the difference between the activity as induced by the input from the goal setting module and the activity as induced by the Schemata Recognizer. Finally, the obtained error can be backpropagated through time in order to adjust the parameters of the Schemata Recognizer.

Simulation Results

In order to test the proposed framework we produced sensorimotor pattern sequences using a predefined controller $C(\chi, x)$. The controller dynamically changes the values of the state variables $x = (x_1, x_2)^T$ according to equation (1) such that the target values $\chi = (\chi_1, \chi_2)^T$ become reached. The target values were randomly chosen from the interval $[0,10]^2$ and fed into the controller. Thereby, we set $\dot{x}_{max} = \ddot{x}_{max} = 200$ and sampled the dynamics with dt=0.01 s.

$$\tau \dot{x} = -\dot{x}_{max} \cdot \left[ \frac{2}{1 + \exp\left(-\frac{\ddot{x}_{max}}{\dot{x}_{max}} \cdot (x - \chi)\right)} - 1 \right] \quad (12)$$

This collection of experiences should model an initial motor babbling phase, where a robotic device randomly executes motor commands and observes their consequences. Here, the system observes the state variables $x = (x_1, x_2)^T$ as well as motor commands m which are assumed to equal the controller's parameters $m = (\chi_1, \chi_2)^T$.

We used 100 units equally distributed on a 10×10 grid for the schemata map. Furthermore, each of the system components feature 30 hyper basis functions in their hidden layers. The RNNs of the Forward Model as well as the Schemata Recognition Module additionally consist of 2 context units, respectively. The learning was carried as described in the previous section.

The learning algorithm should autonomously develop sensorimotor schemata corresponding to generic behaviors. It should further self-organize a mapping between schemata and sensorimotor pattern sequences which is topology preserving. Once the system acquired the schemata it can use them to recognize, reproduce, or simulate the corresponding behaviors.

Here, we first show the results for the simulation of the behaviors. Therefore, after learning the network parameters were frozen. Next, we activated each schema in different initial situations x(0) and recorded the sequences of state variable values (x(1),x(2), . . . ) which the Forward Model produced using look-ahead prediction, i.e. the prediction at time t has been used as input to the Forward Model at time t+1.

Figure 12:
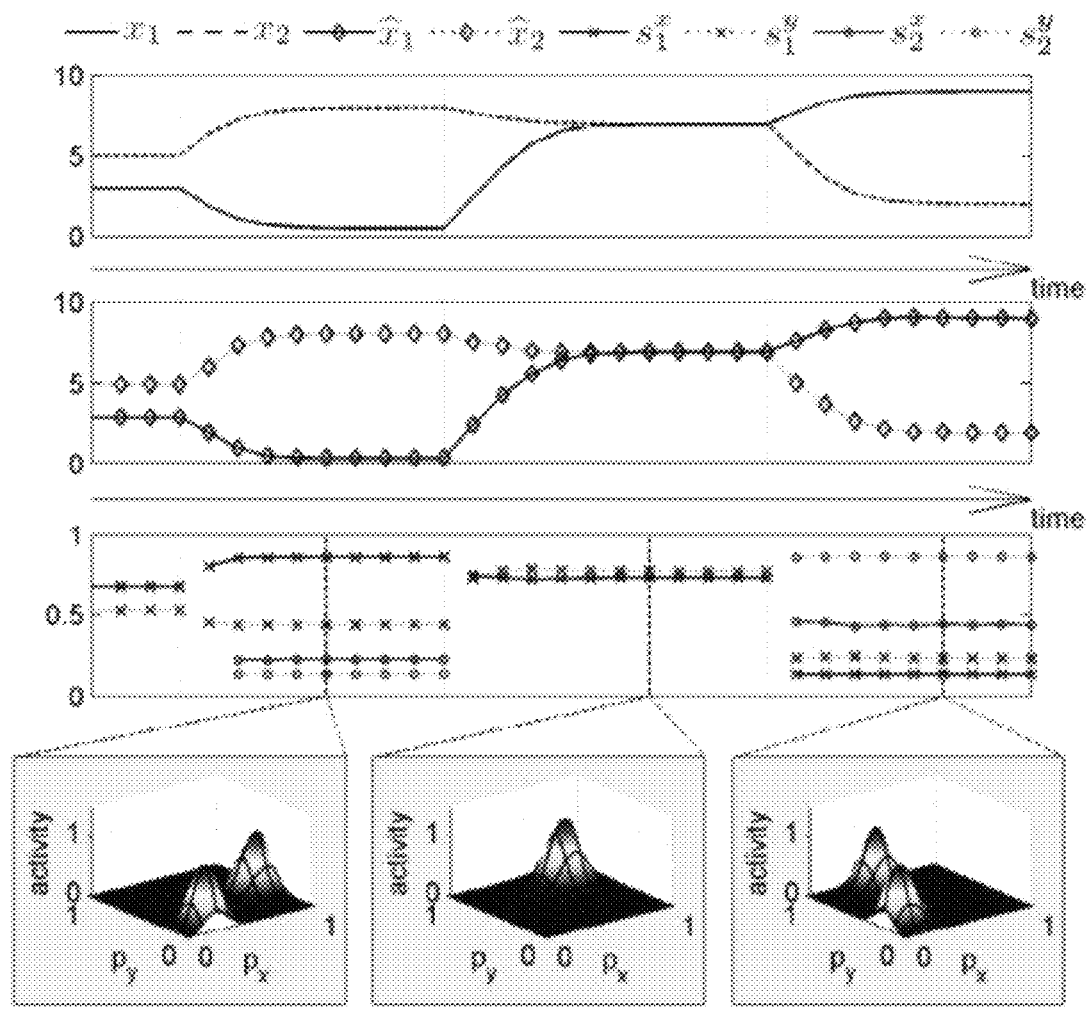
FIG. 12 illustrates the recognition of schemata. The top panel shows an example trajectory of state variable values X where vertical bars indicate time instances when the attractor dynamic has been switched. The bottom panel shows the peak locations $S_1$ and $S_2$ in the schemata map as produced by the Schemata Recognition Module. Furthermore, the insets at the bottom show the schemata map activity corresponding to the shown peak locations for three instances in time. Finally, by using the recognized schemata as input the Forward Model predicted a sequence of state variable values $\hat{x}$. This predicted sequence is shown in the mid panel. As can be seen, the observed and predicted trajectories are very similar which demonstrates that the schemata were correctly identified by the schemata recognizer.

Given the predicted sequences of state variable values (sensory pattern sequences) we calculated the equilibrium points which the applications of the different schemata entail. The equilibrium points thus describe the goals of the schemata. FIG. 12 shows these goals (blue circles) in the $x_1$-$x_2$-plane as well as the sensory pattern sequences of five exemplary chosen schemata (white insets). As can be seen, the learning algorithm developed generic behaviors insofar as the application of a schema in different situations drives the predictions to a single equilibrium point.

For each pair of neighboring schemata (where the neighborhood is defined according to the 2D-grid topology of the schemata map) we additionally connected the corresponding goals. As can be seen, the goals of the different schemata adequately sample the target space $[0,10]^2$. Moreover, the resulting map is nicely ordered which means that the learned mapping between attractor dynamics and schemata is topology preserving, i.e. neighboring schemata represent similar attractor dynamics.

Figure 11:
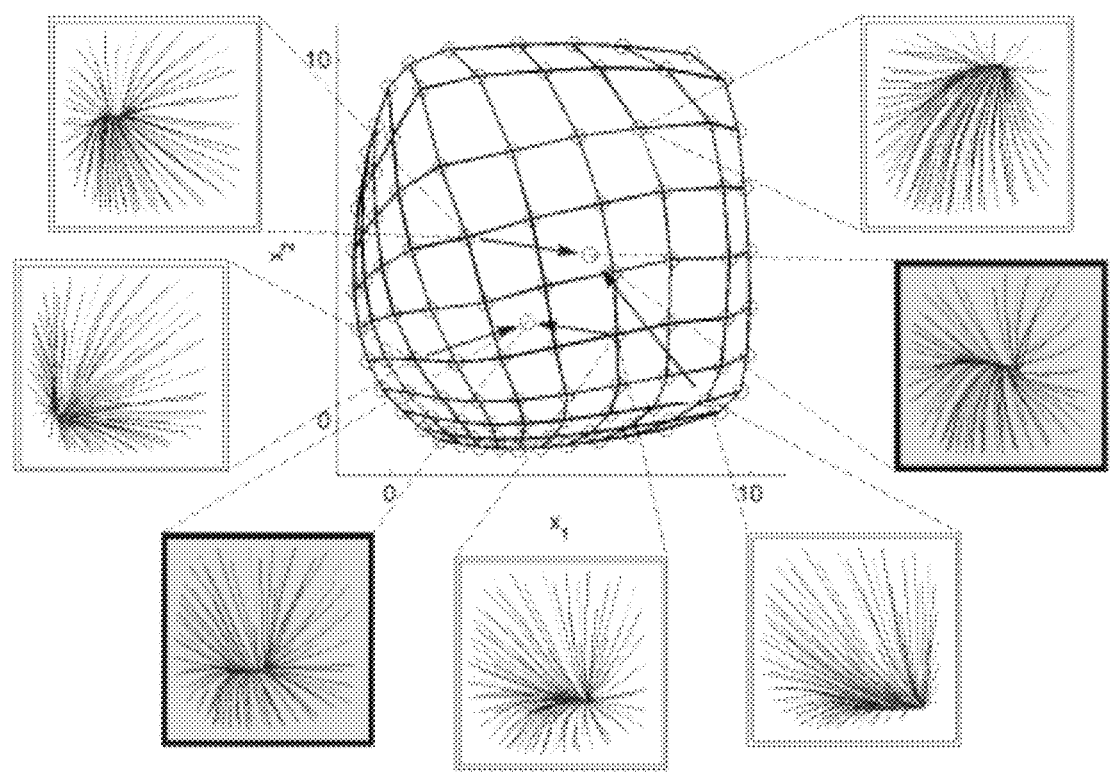
FIG. 11 illustrates the attractor dynamics represented by the different schemata. Thereby the white insets show sensory pattern sequences produced by the Forward Model when activating one out of five exemplary chosen schemata in different situations, respectively. Blue circles correspond to the equilibrium points of the dynamics represented by the schemata, thus, they illustrate the goals of the schemata. The plot further illustrates that the learned mapping is topology preserving insofar as neighbouring schemata serve similar goals. Lastly, the gray insets show two attractor dynamics which were obtained when simultaneously activating pairs of schemata. As can be seen, the simultaneous activation of schemata entails goals (red circles) different from those obtained when activating single schemata (blue circles).

When activating multiple schemata simultaneously, attractor dynamics different from those obtained by activating single schemata can be produced. This fact is also illustrated in FIG. 11. There, we exemplary show the sensory pattern sequences (gray insets) as well as the corresponding goals (red circles) for two pairs of simultaneously activated schemata, respectively. These examples illustrate that the learned schemata form a basis set of generic behaviors. By differently combining schemata other behaviors, which might be even more complex, can be produced.

Next, we demonstrate the performance of the Schemata Recognizer. The recognizer should activate the schemata which best describe an observed sensory pattern sequence. Therefore, we produced an example trajectory of state variable values which is shown in the top panel of FIG. 12. Thereby, the vertical bars indicate instances in time where we switched the attractor dynamic. This sensory pattern sequence was fed into the Schemata Recognizer. FIG. 12 shows the resulting locations of the peaks in the schemata map (bottom panel) as well as the corresponding schemata map activity for three instances in time (insets at the bottom). Finally, the peak locations were used as input to the Forward Model which in turn predicted the sensory pattern sequence shown in the mid panel of FIG. 12. Since the predicted trajectory of state variable values nicely resembles the observations, the Schemata Recognizer correctly identified the applied attractor dynamic. More precisely, the peaks in the schemata map are adjusted during the initial time steps after the attractor dynamic has been switched. This is indicated by the observed discontinuities in peak locations (bottom panel) and corresponds to an initial guess of which schemata have been applied. Later on, when more patterns of the dynamic have been observed, the initial guess is just slightly adjusted insofar as peak locations just slightly change.

Further Embodiments

A controller where a population readout mechanism is applied on the neural map. The population readout mechanism produces smooth localized peaks and extracts their locations in the neural map.

A controller and method where the readout mechanism is computed based on an iterative application of equations (6) and (7).

A controller and method where the schemata state input for the forward and inverse model is computed from locations of peak activity in the neural map.

A controller and method where the parameters of the system are learned via error backpropagation.

A controller and method where the error is calculated at the outputs of the forward and inverse model, respectively. On the one hand the error is based on the difference between the forward model's prediction and the observed values of state variables. On the other hand it is based on the difference between the inverse model's predicted action and the actually executed action.

A controller and method where the error is calculated at the schemata state memory structure. Thereby, schemata are selected by external input or hierarchical feedback. Furthermore, the state variable values are predicted by the forward model module and finally the switching module allows the usage of the predicted state variable values by the schema recognition module. Consequently, the error is based on the difference between selected schemata and recognized schemata. (see FIG. 10)

A controller and method where a robotic device experiences actions and state variable values through motor babbling. Thereby, motor babbling refers to a mode in which a robotic device randomly executes motor commands and observes their consequences on the values of the state variables.

A controller and method where a robotic device experiences actions and state variable values through direct guidance.

A controller and method where the current state of the schemata is defined by the recognition module.

A controller and method where the current state of the schemata is defined by an external input.

A controller and method where the inverse model additionally selects further schemata in a hierarchy of schemata.

A controller and method where the recognition of hierarchically organized schemata additionally rely on previously recognized schemata.

We claim:

1. A robotic controller using schemata, the schemata being a set of parameterized sequences of motor commands in order to make a robot achieve a set goal, the parameters for the sequences being gained from the state variables of the robotic controller, the robotic controller comprising:
    an interface for supplying sensory input to the robotic controller,
    a schemata state memory structure supplied with either input from a schemata recognition module or input from an inverse model module or combinations of them,
    an inverse model module for generating motor commands based on state variables and stored schemata,
    a forward model module for predicting state variables based on state variables and stored schemata, where the forward model is implemented using a recurrent neural network, and
    a schemata recognition module for selecting a schemata based on supplied state variables of the robot controlled by the robotic controller.

2. The controller according to claim 1, furthermore comprising an additional switching module allows to switch between the usage of the currently sensed state variable values and the predicted state variable values as input to the forward model module, the inverse model module, and the recognition module.

3. The controller according to claim 1, where the forward model predicts the future values of the state variables depending on their current values as well as the current states of the schemata.

4. The controller according to claim 1, where the forward model predicts the derivatives of the state variables depending on their current values as well as the current states of the schemata.

5. The controller according to claim 3, where the forward model is implemented using a time-delay neural network.

6. The controller according to claim 1, where the neural network uses radial basis functions or hyper basis functions as representations in its hidden layer.

7. The controller according to claim 1, where the inverse model selects actions producing the attractor dynamics of the currently active schemata depending on the current values of the state variables as well as the current states of the schemata.

8. The controller according to claim 1, where the inverse model selects action derivatives producing the attractor dynamics of the current active schemata depending on the current values of the state variables as well as the current states of the schemata.

9. The controller according to claim 7, where the inverse model is implemented using a recurrent neural network.

10. The controller according to claim 7, where the inverse model is implemented using a time-delay neural network.

11. The controller according to claim 7, where the inverse model is implemented using a feed-forward neural network.

12. The controller according to claim 9, where the neural network uses radial basis functions or hyper basis functions as representations in its hidden layer.

13. The controller according to claim 3, where the inverse and forward models are combined in a single module.

14. The controller according to claim 1, where the recognition of the schemata is done using the current values of the state variables and their history.

15. The controller according to claim 14, where the recognition of the schemata is done using a recurrent neural network.

16. The controller according to claim 14, where the recognition of the schemata is done using a time-delay neural network.

17. The controller according to claim 15, where the neural network uses radial basis functions or hyper basis functions as representations in its hidden layer.

18. The controller according to claim 1, where the memory structure of the schemata states is a neural map composed of units distributed on a multi-dimensional grid.

19. The controller according to claim 18, where the neural map features a topographical organization, which is neighboring schemata representing similar attractor dynamics.

* * * * *